United States Patent [19]
Chiappetta et al.

[11] Patent Number: 5,949,580
[45] Date of Patent: Sep. 7, 1999

[54] MULTIPOLE LIGHT SWITCH OR MULTIPLEXER USING ROTATOR AND INTERFEROMETER

[75] Inventors: Mark Christopher Chiappetta, Clifton Park, N.Y.; Harvey Lawrence Wagner, Hereford Township, Berks County, Pa.

[73] Assignee: Lockheed Martin Corp., Sunnyvale, Calif.

[21] Appl. No.: 08/980,571

[22] Filed: Dec. 1, 1997

[51] Int. Cl.$^6$ .............................. G02B 27/10; H04J 14/02
[52] U.S. Cl. ............................................. 359/618; 359/128
[58] Field of Search ...................... 359/618, 634, 359/117, 128

[56] References Cited

U.S. PATENT DOCUMENTS

5,646,762  7/1997  Delavaux et al. ...................... 359/173
5,680,235  10/1997  Johansson ............................... 359/110

*Primary Examiner*—Georgia Epps
*Assistant Examiner*—Ricky Mack
*Attorney, Agent, or Firm*—W. H. Meise; R. P. Kennedy

[57] ABSTRACT

A two-way light amplitude divider includes a light rotator (18) with first (18$_1$), second (18$_2$) and third (18$_3$) ports. The second port is coupled to a port of a controllable Fabry-Perot etalon (22). The etalon can take on a state in which a particular $\lambda$ of light is passed, and others are reflected. Light at $\lambda_1$ applied to the first port (18$_1$) of the rotator (18) passes through the etalon (22) to a port (22$_2$) when the etalon (22) is in its first state, and the light is reflected by the etalon (22) in its second state, and flows to the third port (18$_3$) of the rotator (18). Thus, the arrangement (10) acts as a single-pole, double throw switch, depending upon the state of the etalon. The arrangement can be cascaded in a manner which operates as a multiplexer (700) or demultiplexer (600).

8 Claims, 7 Drawing Sheets

MULTIPOLE LIGHT SWITCH OR MULTIPLEXER USING ROTATOR AND INTERFEROMETER

FIELD OF THE INVENTION

This invention relates to optical systems, and more particularly to optical systems for switching light signals among plural ports.

BACKGROUND OF THE INVENTION

Optical control systems have significant advantages over electronic systems in terms of signal or RF (radio-frequency) electromagnetic interference. Also, optical signal-processing systems can provide a significant size and weight reduction over corresponding RF systems. There is a need for optical switches and multiplexing arrangements.

SUMMARY OF THE INVENTION

A controllable light amplitude divider operates at a particular wavelength, for controllably dividing light from a source of light into two portions which, together, represent the amplitude of the input light. Thus, the divider acts as a controllable power divider. The operation of the divider is, of course, subject to light losses within the apparatus, and is also subject to leakage of light. Each divided portion of the light is coupled to first and second utilization devices. The divider comprises a light rotator including first, second, and third ports, for coupling light applied to the first port of the rotator to the second port of the rotator and not to the third port of the rotator, and for coupling light applied to the second port of the rotator to the third port of the rotator, and not to the first port of the rotator. A first coupling arrangement is coupled to the source of light and to the first port of the rotator, for coupling light between the source of light and the first input port of the rotator. A controllable Fabry-Perot etalon includes a first port coupled to the second port of the light rotator, and also includes a second port. The Fabry-Perot etalon is controllable, at the particular wavelength, to (a) a first state in which light applied to the first port of the Fabry-Perot etalon is reflected, and (b) a second state in which the Fabry-Perot etalon passes light applied to the first port to the second port. A second coupling arrangement is coupled to the second port of the Fabry-Perot etalon and to the first utilization arrangement, for coupling light between the second port of the Fabry-Perot etalon and the first utilization arrangement. A third coupling arrangement is coupled to the third port of the light rotator and to the second utilization arrangement, for coupling light between the third port of the light rotator and the second utilization arrangement. A control arrangement is coupled to the Fabry-Perot etalon, for causing the Fabry-Perot etalon to assume at least the first and second states, whereby, in the first state of the Fabry-Perot etalon, light propagating to the first port of the Fabry-Perot etalon from the second port of the light rotator is reflected back to the second port of the light rotator, and rotated to the third port of the light rotator for being made available to the second utilization arrangement, and in the second state of the Fabry-Perot etalon, light propagating to the first port of the Fabry-Perot etalon passes to the second port of the Fabry-Perot etalon, and is made available to the first utilization arrangement.

In a particular embodiment of the invention, the control arrangement controls the Fabry-Perot etalon to only the first and second states, whereby the divider acts as a single-pole, double-throw light switch for switching light from the source between the first and second utilization arrangement.

In a particular embodiment of the invention, the first, second and/or third light coupling arrangements may include a focussing lens, such as a Selfoc lens, and may also include an optical fiber.

The light rotator may be a Faraday rotator, and the material may be YAG.

The Fabry-Perot etalon of the arrangement may have a comb spectral response including (a) transmission peaks at spaced-apart wavelengths, and (b) transmission nulls corresponding to reflective peaks, the transmission nulls occurring at wavelengths lying between adjacent transmission peaks, in which case the second state corresponds to a state in which one of the transmission peaks lies at the particular wavelength. The reflection peaks may correspond with transmission nulls lying at wavelengths between the transmission peaks, and such reflection peaks tend to be broader than the transmission peaks. The first state of the arrangement corresponds to a state in which one of the reflection peaks lies at the particular wavelength, or, similarly, in which the particular wavelength lies on one of the reflection peaks.

BRIEF DESCRIPTION OF THE DRAWING

FIG. 1$a$ is simplified semipictorial representation of an apparatus according to an aspect of the invention, FIG. 1$b$ is an exploded view of the apparatus of FIG. 1$a$ with slight modifications, illustrating a rotator and an etalon, and FIG. 1$c$ is a side elevation of the apparatus of FIG. 1$b$ in its assembled form;

FIG. 2$a$ represents the apparatus of FIGS. 1$a$ or 1$c$ with the etalon in a first state, and FIG. 2$b$ represents the apparatus of FIGS. 1$a$ or 1$c$ with the etalon in a second state;

FIG. 3$a$ is a simplified representation of a portion of the transmission spectrum of an agile Fabry-Perot etalon as used in the arrangement of FIGS. 1$a$, 1$b$, or 1$c$, and FIG. 3$b$ is a representation of a portion of the reflection spectrum of an agile Fabry-Perot etalon as used in the arrangement of FIGS. 1$a$, 1$b$, or 1$c$;

FIG. 4$a$ illustrates a portion of a reflection spectrum of an etalon as used in the arrangement of FIGS. 1$a$, 1$b$, or 1$c$, when in the first state, and FIG. 4$b$ illustrates a portion of a reflection spectrum of an etalon as used in the arrangement of FIGS. 1$a$, 1$b$, or 1$c$, when in the second state;

FIGS. 5$a$ and 5$d$ are simplified representations of the apparatus of FIGS. 1$a$, 1$b$, and 1$c$ used a double-pole, double-throw switch; FIG. 5$b$ illustrates a plot of the reflection characteristics of the etalon of FIG. 5$a$, and FIG. 5$c$ is a plot representing the reflection response of the etalon of FIG. 5$d$;

DESCRIPTION OF THE INVENTION

Figure 1A:
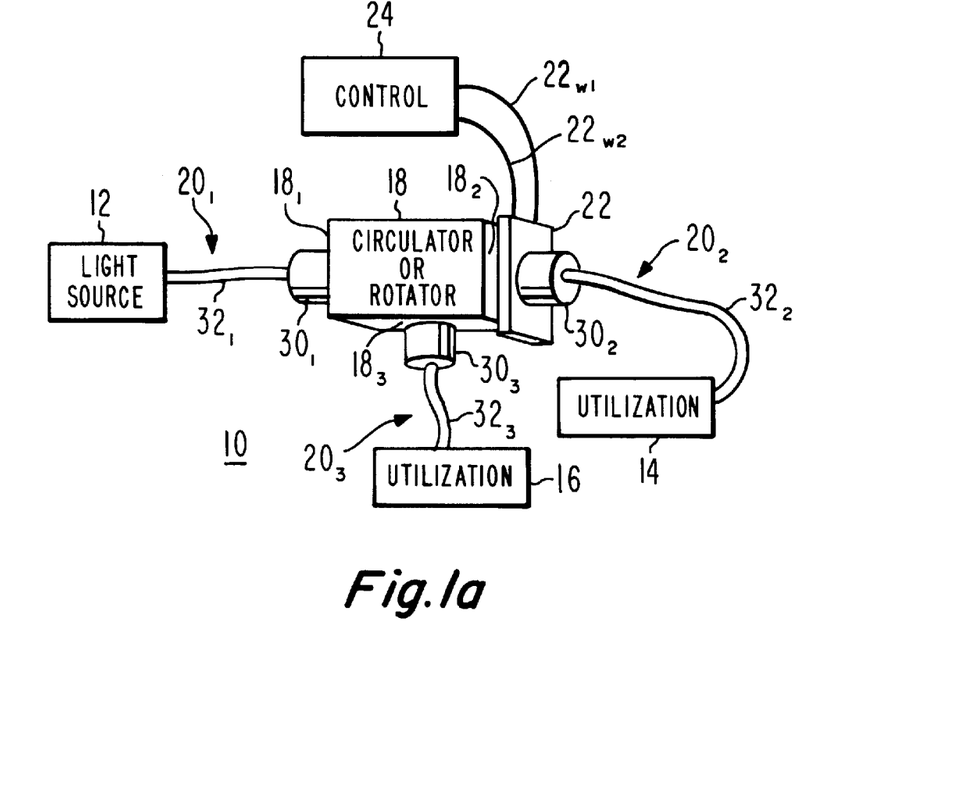

FIG. 1$a$ is semipictorial representation of an apparatus 10 according to the invention. The apparatus 10 may be used as a power divider, switch, or multiplexer, and possibly for other purposes, but for simplicity it will be termed a "divider" herein.

Figure 1B:
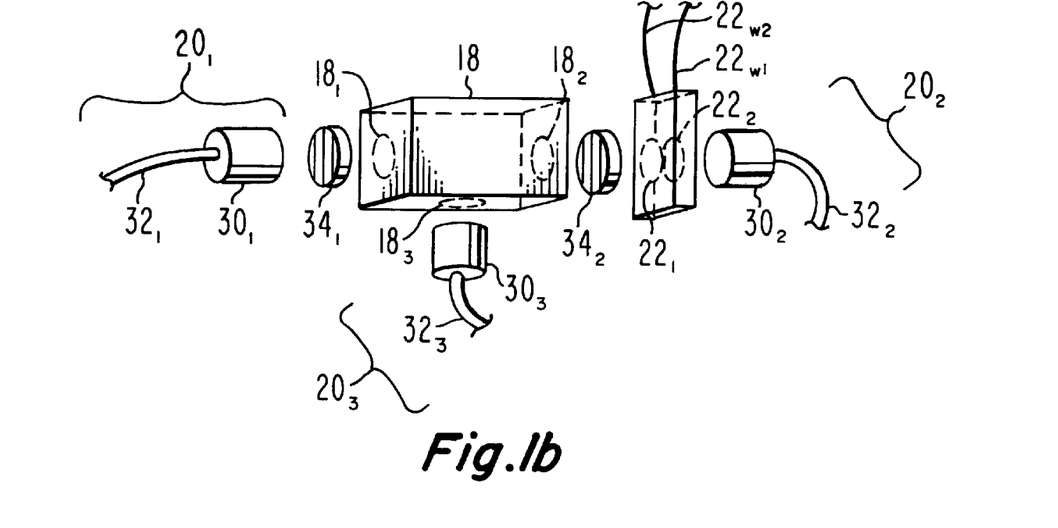
Figure 1C:
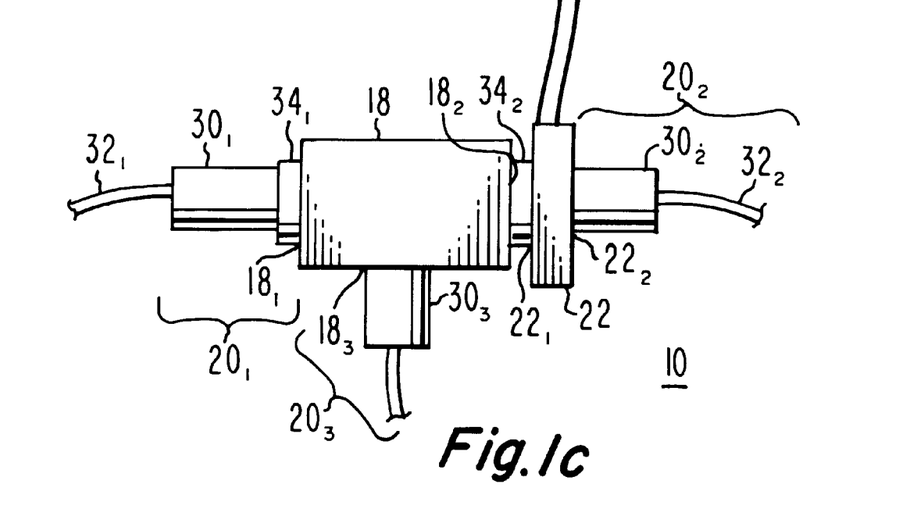

In FIGS. 1$a$, 1$b$, and 1$c$, a light circulator or rotator 18 has a first or input port $18_1$, a second port $18_2$, and a third port $18_3$. Light rotator 18 is a conventional device, readily available on the commercial market, and is sold by, for example, E-TEK Dynamics Inc., 1885 Lundy Ave., San Jose, Calif. 95131 as model number PIFC2100+1000. Light rotator 18 accepts light at its first port $18_1$, and routes the light so applied to exit at second port $18_2$, and not at third port $18_3$. Light rotator 18 accepts light at its second port $18_2$, and routes the light so applied to exit at third port $18_3$, and not at first port $18_1$. Such devices normally also rotate signal applied to the third port $18_3$ so as to exit at first port $18_1$, and not at port $18_2$.

In the arrangement of FIG. 1a, a first light coupling arrangement $20_1$, including a focussing lens $30_1$ and an optical fiber $32_1$, couple light from a source 12 of light to input port $18_1$ of rotator 18. The lens $30_1$ improves the coupling between port $18_1$ and the optical fiber $32_1$. As a result of the application of light to port $18_1$, rotator 18 rotates the light applied to its first input port $18_1$ to its second output port $18_2$. The light exits second port $18_2$, and arrives at a first or input port $22_1$ of an interferometer in the form of an agile or controllable Fabry-Perot etalon 22.

Figure 3A:
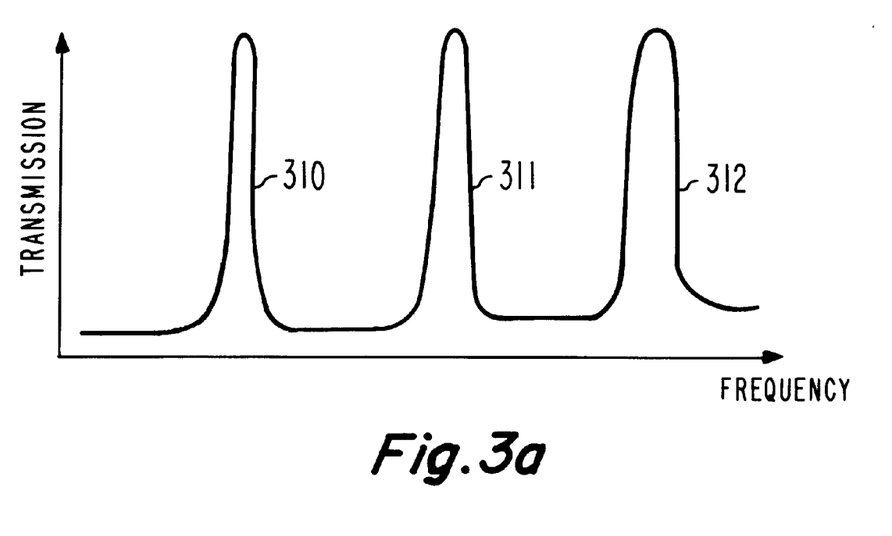
Figure 3B:
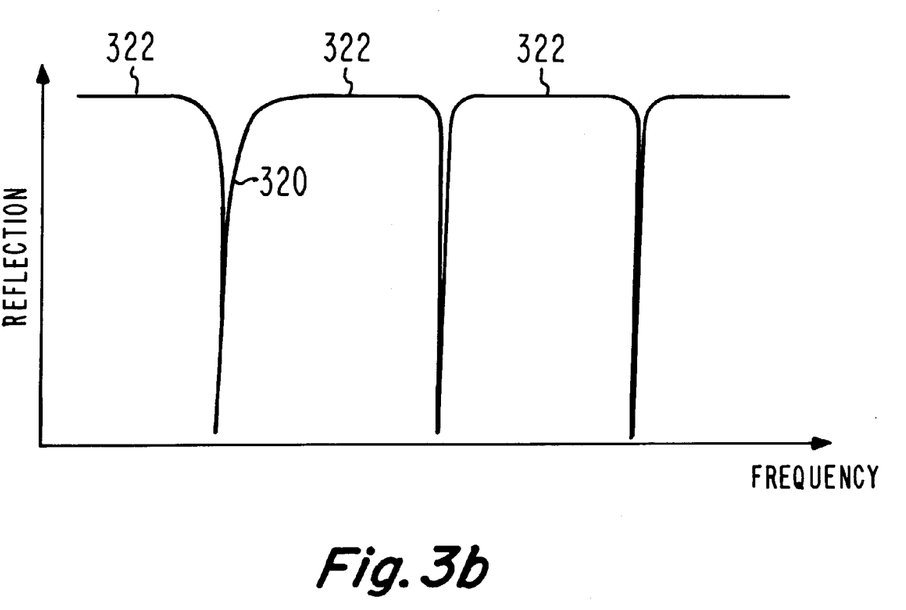

Fabry-Perot etalon 22 of FIGS. 1a, 1b, or 1c is rendered agile by the use of a material (not illustrated) between its reflectors or mirrors (not illustrated) which has index of refraction controllable in response to a control signal. In the illustrated arrangement, the control signal is in the form of a bias voltage applied to the electrodes (not illustrated) of etalon 22 from a control block 24, by way of electrical conductors $22_{W1}$ and $22_{W2}$. Such etalons are well known in the art, and have the light transmission and reflection characteristic illustrated, in part, in FIGS. 3a and 3b, respectively. More particularly, the transmission characteristics of an agile Fabry-Perot etalon versus frequency are illustrated by plot 310 of FIG. 3a. It should be noted that frequency and wavelength are mathematically related by a mathematical constant, so descriptions in terms of frequency and wavelength are often interchanged, with the inverse aspect of the relationship being understood. Since the plots illustrated in FIGS. 3a and 3b are symmetrical when reversed from right to left, the plots may be taken as being plotted against wavelength rather than frequency. The transmission spectrum of an etalon as illustrated in FIGS. 3a and 3b is in the form of a comb or series of peaks, of which only peaks 310, 311, and 312 are illustrated. As illustrated, peaks 310, 311, and 312 are relatively narrow, and they are spaced apart by frequency (or wavelength) intervals which are greater than the intervals defining the widths of the peaks 310, 311, and 312. Plot 320 of FIG. 3b is a plot of the reflection characteristics of the etalon which gives the transmission characteristics of FIG. 3a. As illustrated in plot 320, the reflection characteristic is in the form of relatively broad regions 322 of maximum reflection, separated by sharp reflection nulls. The comb spectrum of FIG. 3a can be shifted to the right or left (up or down in frequency) in response to variation of the bias signal applied to the etalon which generates the comb spectrum, and this of course causes a concomitant change in the frequency of the reflection nulls of FIG. 3b. The spacing between adjacent transmission peaks can be selected by control of the separation of the mirrors of the etalon, as known.

Returning now to consideration of FIGS. 1a, 1b, and 1c, the input port $22_1$ of etalon 22 is coupled to second port $18_2$ of rotator 18. When etalon 22 is in a first operating state, in which it reflects at the wavelength of the light produced by source 12, the light exiting from second port $18_2$ of rotator 18 effectively reflects from port $22_1$ of etalon 22, returning toward second port $18_2$ of rotator 18. In this condition, the reflected light is entering the rotator at port $18_2$, whereupon the rotator rotates the light to exit from third output port $18_3$. A third coupling arrangement $20_3$, including a focussing lens $30_3$ and an optical fiber $32_3$, couples the light exiting from the third port $18_3$ of rotator 18 to second utilization block 16.

Figure 4A:
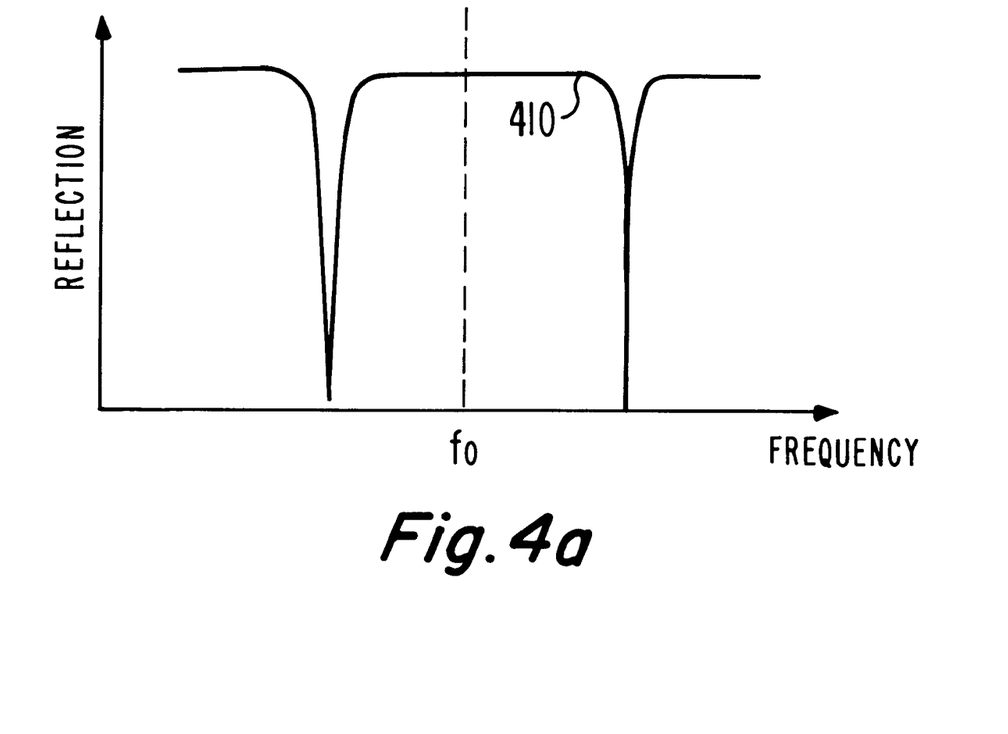
Figure 4B:
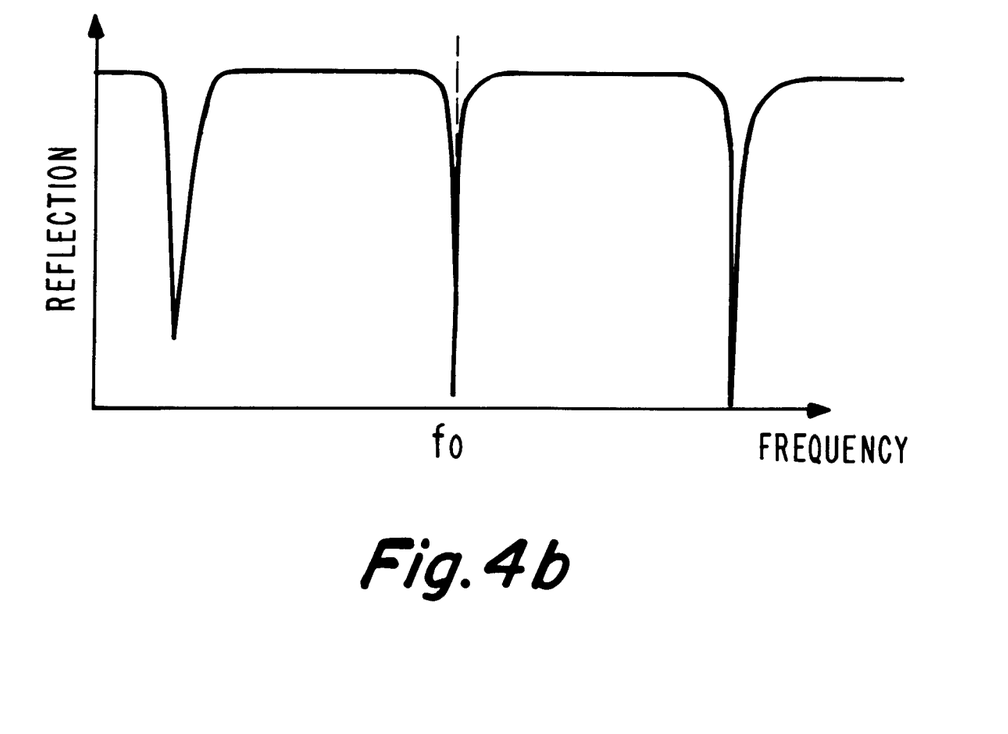

Referring now to FIG. 4a, the wavelength or frequency of the light signal from light source 12 is illustrated as being $f_0$. Plot 410 of FIG. 4a shows that the reflection of etalon 22 is at or near a maximum at frequency or wavelength $f_0$. Consequently, etalon 22 is in the first state referred to above, in which light entering the rotator 18 from the light source is routed to second utilizing arrangement 16. FIG. 4b shows a condition in which the comb spectrum of the etalon has been moved, by use of the bias signal, so that a reflection null, corresponding to a transmission maximum, lies at $f_0$. In this condition of the etalon, transmission of light signal at $f_0$ occurs, so that the etalon is in the second state referred to above, in which light entering the rotator 18 from light source 12 is rotated to the first utilization arrangement 14.

Figure 2A:
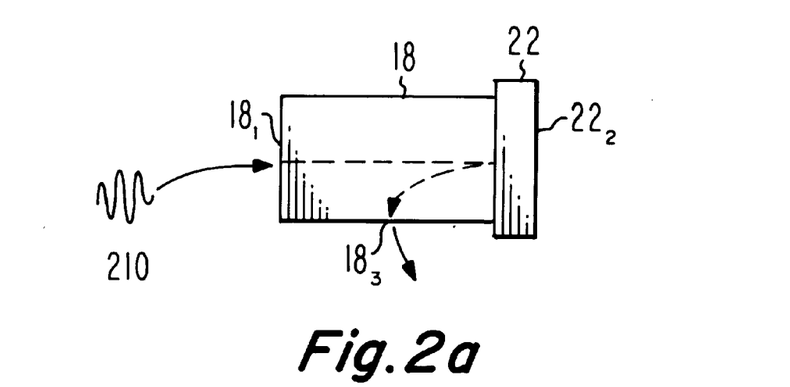
Figure 2B:
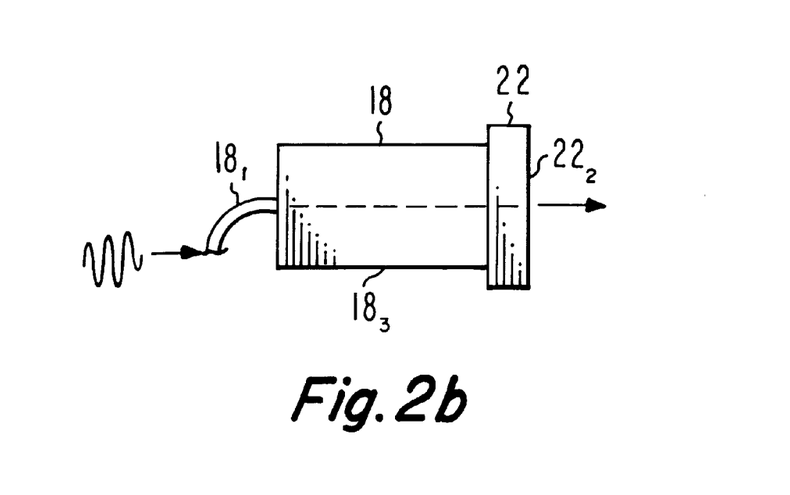

FIG. 2a is a simplified representation of the flow of light in an apparatus according to the invention when operating in the aforementioned first state. In FIG. 2a, elements of the arrangement of FIG. 1 are designated by like reference numerals. Light, illustrated by a photon symbol 210, arriving at input port $18_1$ of rotator 18 is rotated to etalon 22 and reflected, and the light exits from rotator port $18_3$. FIG. 2b is the same as FIG. 2a, except that the etalon 22 is in its transmissive second state, so that light which is applied to first port $18_1$ of rotator 18 is rotated to etalon 22, and is transmitted through etalon 22 to exit at the second port $22_2$ of etalon 22.

As mentioned above, FIGS. 1b and 1c differ somewhat from FIG. 1a, in that the arrangements of FIGS. 1b and 1c include polarizing filters 34 in their light paths. More particularly, in the arrangements of FIGS. 1b and 1c, a first polarizing filter $34_1$ is included in light coupling arrangement $20_1$, and a second polarizing filter $34_2$ is included in light coupling arrangement $20_2$. Typical present-day rotators use birefringent materials to perform the rotation, and the materials therefore do not perform in an identical manner on both components of incident light having random polarization. The presence of first filter $34_1$ selects the polarization which provides the desired response from the rotator 18.

At the current state of the art, agile etalons also tend to be polarization-sensitive. Second filter $34_2$ selects or limits the polarization applied to the etalon 22 so as to operate in the desired mode. The use of polarization filters improves the leakage and loss characteristics of the divider 10.

When etalon 22 is in a second state, in which the etalon is transmissive at the wavelength of the light produced by source 12, the light passes through the etalon 22 and exits the etalon at its second or output port $22_2$. A second coupling arrangement $20_2$ couples light exiting from output port $22_2$ of etalon 22 to a first utilization arrangement illustrated as a block 14. As illustrated in FIG. 1a, second coupling arrangement $20_2$ includes a focussing lens $30_2$ and an optical fiber $32_2$. The lens $30_2$ improves the coupling between etalon port $22_2$ and the optical fiber $32_2$.

When etalon 22 is in a first operating state, in which it reflects at the wavelength of the light produced by source 12, the light effectively reflects from port $22_1$ of etalon 22 and exits the etalon, returning toward second port $18_2$ of rotator 18.

Figure 5A:
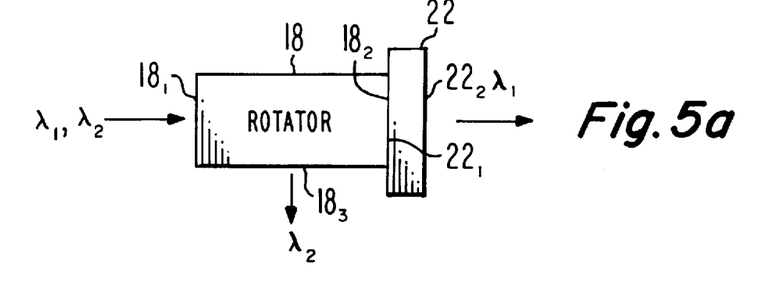
Figure 5B:
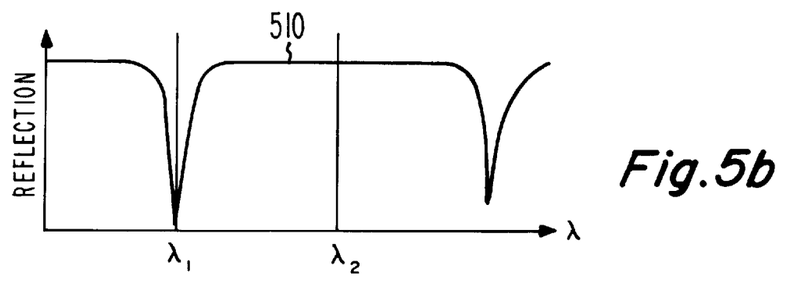

The apparatus of FIGS. 1a, 1b, and 1c can be used a double-pole, double-throw switch. Referring to FIG. 5a, light is applied to first port $18_1$ of rotator 18 at two different frequencies, designated as wavelengths $\lambda_1$ and $\lambda_2$. FIG. 5b illustrates as a plot 510 the reflection characteristics of the etalon 22 of FIG. 5a relative to $\lambda_1$ and $\lambda_2$. As illustrated in FIG. 5b, the reflection is at a minimum, and therefore transmission is at a maximum, at wavelength $\lambda_1$, and the reflection is at a maximum at $\lambda_2$. Consequently, the etalon is in its first state, as defined above, for light at wavelength $\lambda_2$, and the light at wavelength $\lambda_2$ therefore exits from the third port 18$_3$ of rotator 18, while, for light at wavelength $\lambda_1$, the etalon is in its second state, and therefore light at wavelength $\lambda_1$ exits from second port 22$_2$ of etalon 22. Thus, in the first state of etalon 22 of FIG. 5a, light at wavelength $\lambda_1$ exits from second port 22$_2$ of etalon 22, while light at wavelength $\lambda_2$ exits from the third port 18$_3$ of rotator 18.

Figure 5C:
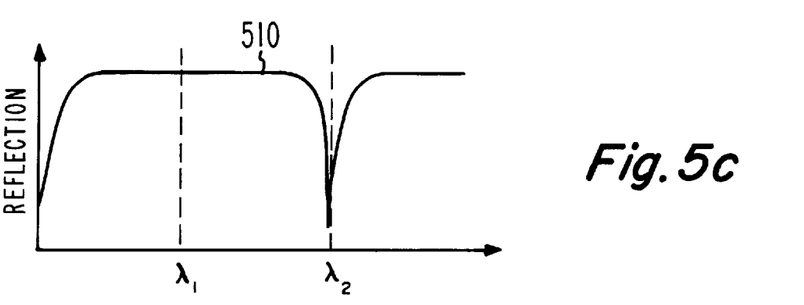
Figure 5D:
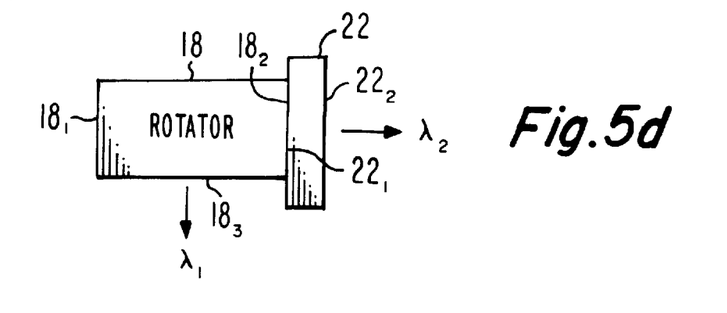

Referring now to FIG. 5c, plot 510, representing the reflection response of the etalon 22 of FIG. 5d, is shifted in wavelength, so that light at wavelength $\lambda_1$ is at a reflection peak, and light at wavelength $\lambda_2$ is at a transmission peak. In the second state of etalon 22 of FIG. 5a, light at wavelength $\lambda_2$ exits from second port 22$_2$ of etalon 22, while light at wavelength $\lambda_1$ exits from the third port 18$_3$ of rotator 18. The double pole, double throw nature of the switch is evident. The structure of FIG. 5a may be viewed as a demultiplexer, in that light at both wavelengths $\lambda_1$ and $\lambda_2$ flows into port 18$_1$, and the two wavelengths selectively exit from separate ports 18$_3$ or 22$_2$, depending upon the state of the etalon 22.

Figure 6:
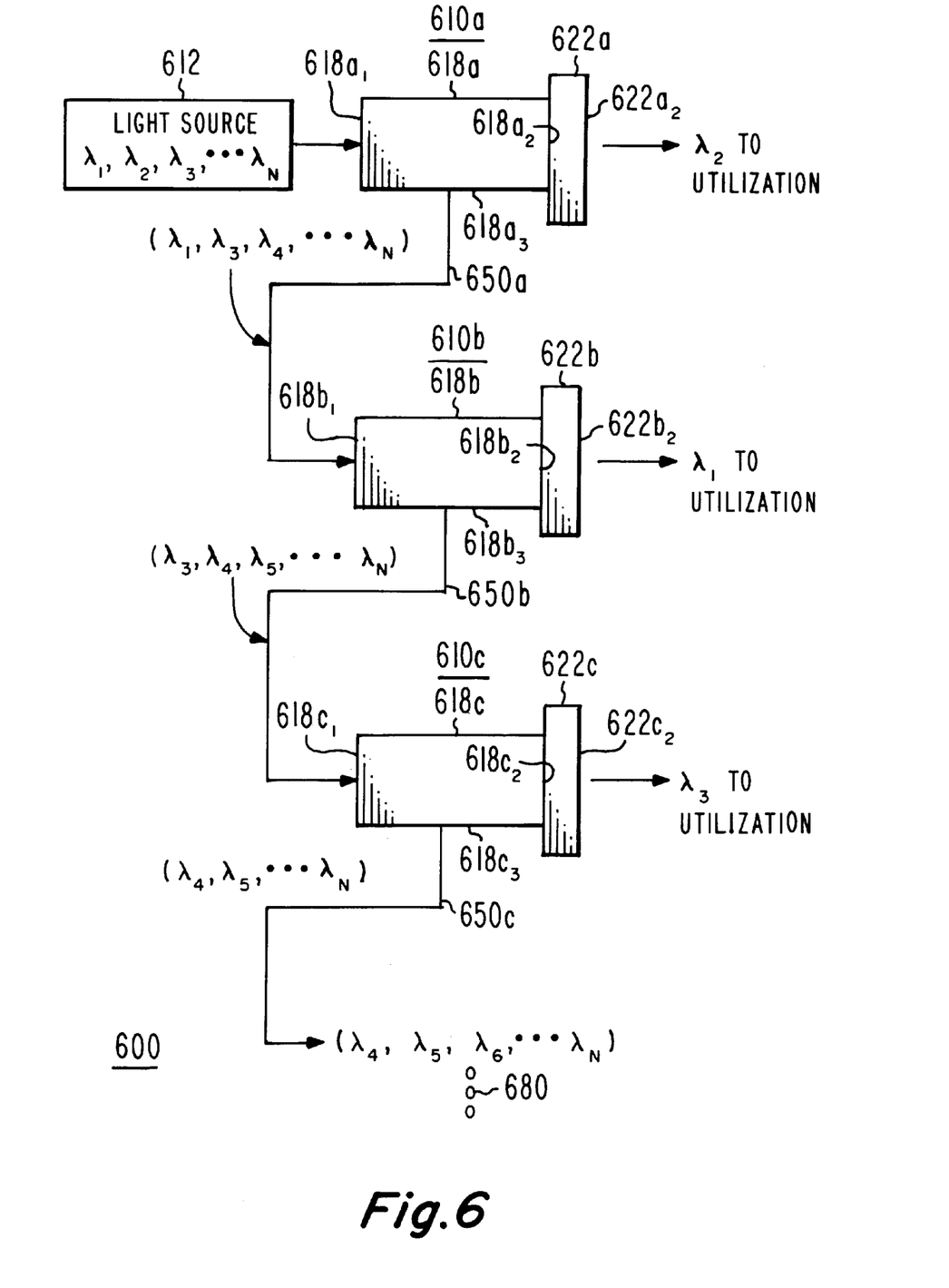
FIG. 6 is a simplified representation of an optical wavelength demultiplexer including a plurality of dividers such as that of FIG. 1$a$, 1$b$, and 1$c$.

Another embodiment of a demultiplexer 600 according to an aspect of the invention is illustrated in FIG. 6. In FIG. 6, demultiplexer 600 includes a cascade of dividers corresponding to divider 10 of FIG. 1. As illustrated in FIG. 6, the cascade includes a first divider 610a, a second divider 610b, and a third divider 610c. Those skilled in the art will recognize that the number of such dividers which can be cascaded ranges, at least in theory, from two (610a and 610b, for example) to an infinite number. The possibility of additional dividers is suggested in FIG. 6 by ellipsis 680.

In the arrangement of FIG. 6, light including wavelength components indicated as $\lambda_1, \lambda_2, \lambda_3, \ldots, \lambda_N$ is generated in a light source 612, and is applied to an input port 618a$_1$ of the rotator 618a of a divider 610a. A controllable Fabry-Perot etalon 622a is coupled to a second port 618a$_2$ of rotator 618a. As described above, etalon 622a can be controlled to pass a wavelength, such as $\lambda_2$, and reflect most other frequencies. When etalon 622a is set to a first state in which it passes $\lambda_2$ to its output port 622a$_2$, it also reflects $\lambda_1$, $\lambda_3, \lambda_4, \ldots, \lambda_N$ back to port 618a$_2$ of rotator 618a. Light at wavelengths $\lambda_1, \lambda_3, \lambda_4, \ldots, \lambda_N$ pass in a retrograde direction through rotator 618a, and exit from rotator 618a at port 618a$_3$. The light components at wavelengths $\lambda_1, \lambda_3, \lambda_4, \ldots, \lambda_N$ flow from port 618a$_3$ and through light path 650a to an input port 618b$_1$ of a second divider 610b.

Light at wavelengths $\lambda_1, \lambda_3, \lambda_4, \ldots, \lambda_N$ flowing into port 618b$_1$ of second divider 610b propagates through rotator 618b of second divider 610b to exit from port 618b$_2$ of rotator 618b. A controllable Fabry-Perot etalon 622b associated with divider 610b can be controlled to a state in which it passes $\lambda_1$, and reflects the other wavelengths $\lambda_3, \lambda_4, \ldots, \lambda_N$. Light at wavelength $\lambda_1$ is passed through etalon 622b and exits from its port 622b$_2$ to a utilization apparatus (not illustrated). Etalon 628b reflects the other wavelengths $\lambda_3$, $\lambda_4, \ldots, \lambda_N$, which pass into port 618b$_2$. The light entering port 618b$_2$ at wavelengths $\lambda_3, \lambda_4, \ldots, \lambda_N$ propagates in retrograde direction through rotator 618b to port 618b$_3$, where it exits. Thus, light at wavelengths $\lambda_3, \lambda_4, \ldots, \lambda_N$ exits from port 618b$_3$ of divider 610b, and flows through a light path 650b to an input port 618c$_1$ of a further divider 610c.

Light at wavelengths $\lambda_3, \lambda_4, \ldots, \lambda_N$ flowing into port 618c$_1$ of third divider 610c propagates through rotator 618c of third divider 610c to exit from port 618c$_2$ of rotator 618c. A controllable Fabry-Perot etalon 622c associated with divider 610c can be controlled to a state in which it passes $\lambda_3$, and reflects the other wavelengths $\lambda_4, \lambda_5, \ldots, \lambda_N$. Light at wavelength $\lambda_3$ is passed through etalon 622c and exits from its port 622c$_2$ to a utilization apparatus (not illustrated). Etalon 622c reflects the other wavelengths $\lambda_4, \lambda_5, \ldots, \lambda_N$, which pass into port 618c$_2$. The light entering port 618c$_2$ at wavelengths $\lambda_4, \lambda_5, \ldots, \lambda_N$, propagates in retrograde direction through rotator 618c to port 618c$_3$, where it exits. Thus, light at wavelengths $\lambda_4, \lambda_5, \ldots, \lambda_N$ exits from port 618c$_3$ of divider 610c, and is available to flow through a light path 650c to the input port of a further divider of a continuation (not illustrated) of the demultiplexer of FIG. 6.

In operation of the arrangement of FIG. 6, any of the etalons can be retuned to extract a particular one of the wavelengths, so long as that particular wavelength has not been extracted at a previous stage of processing. Thus, the arrangement can be used to route light at various wavelengths among a plurality of ports.

Figure 7:
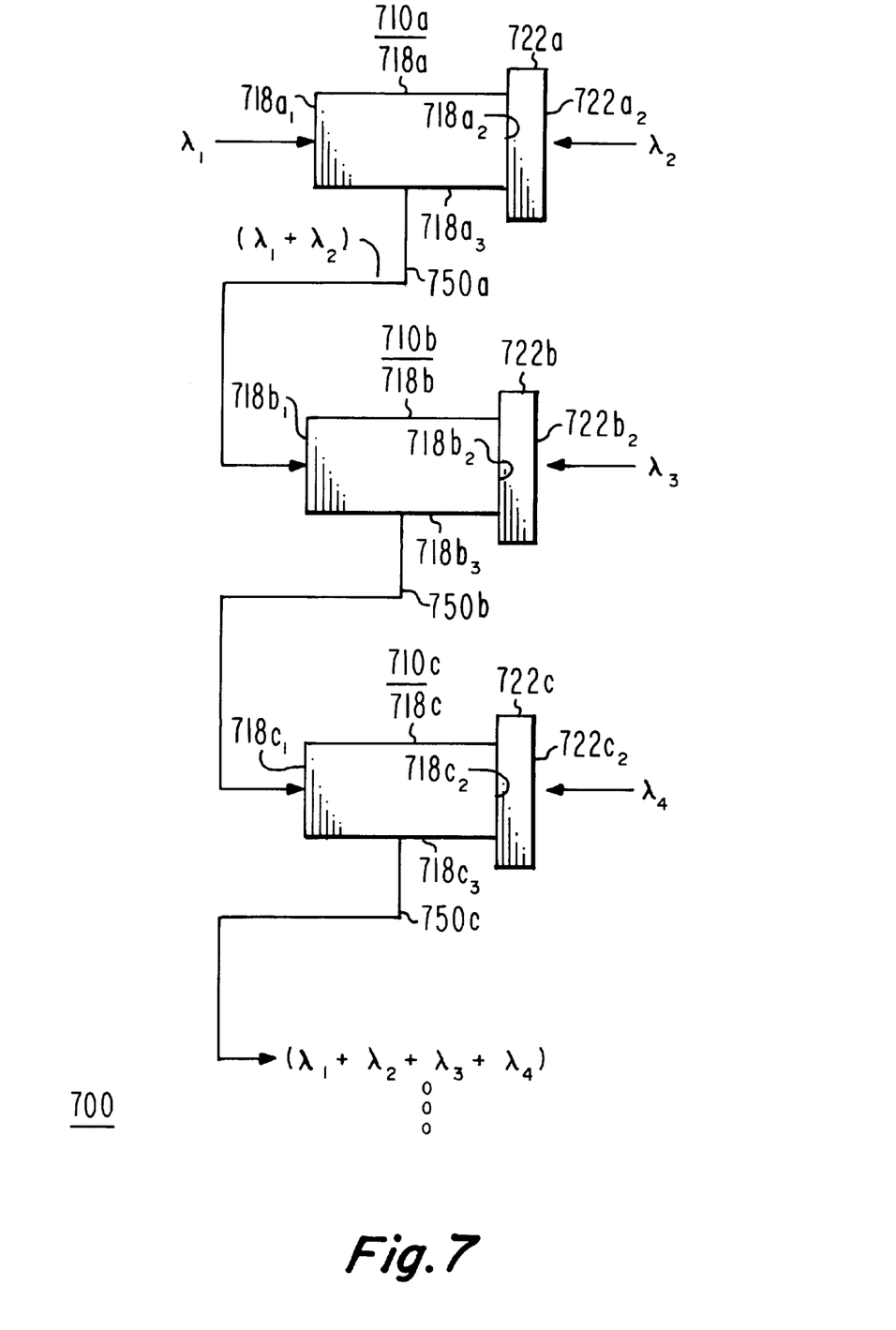
FIG. 7 is a simplified representation of an optical wavelength multiplexer including a plurality of dividers such as that of FIG. 1$a$, 1$b$, and 1$c$.

FIG. 7 is a simplified block diagram of a multiplexer 700 according to an aspect of the invention. In FIG. 7, multiplexer 700 includes a divider 710a similar to the divider of FIGS. 1a, 1b, and 1c. Light at a wavelength $\lambda_1$ is applied to an input port 718a$_1$ of a rotator 718a of divider 710a from a source (not illustrated). The light propagates through rotator 718a to its port 718a$_2$, where it exits and arrives at a Fabry-Perot etalon 722a. Also in FIG. 7, light at a second wavelength $\lambda_2$ is applied from a source (not illustrated) to port 722a$_2$ of etalon 722a. Etalon 722a can be, as described at length above, in one of two states as to any particular wavelength, such as wavelength $\lambda_2$, namely a first state in which the etalon passes the wavelength $\lambda_2$ and reflects a band of other wavelengths including $\lambda_1$, and a second state in which it reflects a band of wavelengths including the wavelength $\lambda_2$. So long as etalon 722a is in its first state, light at wavelength $\lambda_2$ will enter port 722a$_2$ of divider 710a to exit at port 718a$_3$, while light at wavelength $\lambda_1$ will enter port 718a$_1$, of divider 710a to exit at port 718a$_3$. Thus, both wavelengths $\lambda_1$ and $\lambda_2$ enter divider 710a by different ports, but leave by the same port 718a$_3$, and divider 710a thus acts as a multiplexer for wavelengths $\lambda_1$ and $\lambda_2$. In the arrangement of FIG. 7, the multiplexed light exiting port 718a$_3$, and including wavelengths $\lambda_1$ and $\lambda_2$, flows through a light path 750a to a cascade of further dividers 710b, 710c, ... which coact with divider 710a which together form a multiplexer apparatus which, in principle, can multiplex large numbers of wavelengths.

The multiplexed light at wavelengths $\lambda_1$ and $\lambda_2$ flows from port 718a$_3$ of divider 710a of FIG. 7, through light path 750a, and enters port 718b$_1$ of a divider 710b. From port 718b$_1$, the light including wavelengths $\lambda_1$ and $\lambda_2$ is coupled by rotator 718b of divider 710b to port 718b$_2$, from which the light exits to impinge on Fabry-Perot etalon 722b. In consonance with the above descriptions, the etalon can be tuned to pass any desired wavelength, reflecting a large band of other wavelength. In one use of the arrangement of FIG. 7, etalon 722b is tuned to pass $\lambda_3$, and as a result it reflects a large band of wavelengths, including wavelengths $\lambda_1$ and $\lambda_2$. Light at wavelength $\lambda_3$ is received at port 722b$_2$ of divider 710b, and passes through etalon 722b into port 718b$_2$ of rotator 718b. Light at wavelengths $\lambda_1$ and $\lambda_2$ is reflected by etalon 722b, and also enters port 718b$_2$ of rotator 718b. Light at wavelengths $\lambda_1$, $\lambda_2$, and $\lambda_3$ propagates to port 718b$_3$ of divider 710b. Thus, the presence of divider 710b coupled to the output port of divider 710a allows light at a further wavelength, namely wavelength $\lambda_3$, to be added or multiplexed with the incoming light from divider 710a, which incoming light includes light at wavelengths $\lambda_1$ and $\lambda_2$. Thus, light at wavelengths $\lambda_1$, $\lambda_2$, and $\lambda_3$ leaves port $718b_3$ of divider 718b, and flows by way of a light path 750b to a further divider 710c, also operated as a multiplexer.

Divider 710c of FIG. 7 receives the light at wavelengths $\lambda_1$, $\lambda_2$ and $\lambda_3$ at its input port $718c_1$, and routes the light to etalon 722c, as described in detail above. When etalon 722c is set to reflect light at wavelengths $\lambda_1$, $\lambda_2$, and $\lambda_3$, and to pass light at some other wavelength, such as wavelength $\lambda_4$, these four wavelengths are multiplexed, and the multiplexed light signal, including wavelengths $\lambda_1$, $\lambda_2$, $\lambda_3$ and $\lambda_4$ exits from divider 710c at port $718c_3$, and leaves by way of light path 750c. It will be apparent to those skilled in the art that additional dividers can be coupled to light path 750c in order to multiplex additional light wavelengths with those already multiplexed.

Thus, a controllable light amplitude or power divider (10) according to the invention operates at a particular wavelength ($\lambda_0$), for controllably dividing light from a source (12) of light into two portions which, together, represent the amplitude of the input light. While one wavelength is required, the light source (12) may generate a spectral range of light, which will also be acted on by the divider (10); some of the light of the spectral range may be outside of the operating band of the divider (10), and thus may not act as described above. Thus, the divider (10) acts as a controllable power divider at a particular wavelength, or over a range of wavelengths. The operation of the divider (10) is, of course, subject to light losses within the apparatus, and is also subject to leakage of light. Each divided portion of the light is coupled from the divider (10) to first (14) and second (16) utilization devices. The divider (10) comprises a light rotator (18) including first ($18_1$), second ($18_2$), and third ($18_3$) ports, for coupling light applied to the first port ($18_1$) of the rotator to the second port ($18_2$) of the rotator and not to the third port of the rotator, and for coupling light applied to the second port ($18_2$) of the rotator to the third port ($18_3$) of the rotator, and not to the first port ($18_1$) of the rotator. A first coupling arrangement ($20_1$) is coupled to the source (12) of light and to the first port ($18_1$) of the rotator, for coupling light between the source (12) of light and the first input port of the rotator. A controllable Fabry-Perot etalon (22) includes a first port ($22_1$) coupled to the second port ($18_2$) of the light rotator (18), and also includes a second port ($22_2$). The Fabry-Perot etalon (22) is controllable, at the particular wavelength, to (a) a first state (FIG. 2a) in which light applied to the first port ($22_1$) of the Fabry-Perot etalon (22) is reflected, and (b) a second state (FIG. 2b) in which the Fabry-Perot etalon (22) passes light which is applied to its first port ($22_1$) to its second port ($22_2$). A second coupling arrangement ($20_2$) is coupled to the second port ($22_2$) of the Fabry-Perot etalon (22) and to the first utilization arrangement (14), for coupling light between the second port ($22_2$) of the Fabry-Perot etalon (22) and the first utilization arrangement (14). A third coupling arrangement ($20_3$) is coupled to the third port ($18_3$) of the light rotator (18) and to the second utilization arrangement (16), for coupling light between the third port ($18_3$) of the light rotator (18) and the second utilization arrangement (16). A control arrangement (24) is coupled to the Fabry-Perot etalon (22), for causing the Fabry-Perot etalon (22) to selectively assume one of at least the first and second states, whereby, in the first state of the Fabry-Perot etalon (22), light propagating to the first port ($22_1$) of the Fabry-Perot etalon (22) from the second port ($18_2$) of the light rotator (18) is reflected back to the second port ($18_2$) of the light rotator (18), and rotated to the third port ($18_3$) of the light rotator (18) for being made available to the second utilization arrangement (16), and in the second state of the Fabry-Perot etalon (22), light propagating into the first port ($22_1$) of the Fabry-Perot etalon (22) passes to the second port ($22_2$) of the Fabry-Perot etalon (22), and is made available to the first utilization arrangement (14).

In a particular embodiment of the invention, the control arrangement (24) controls the Fabry-Perot etalon (22) to only the first and second states, whereby the divider (10) acts as a single-pole, double-throw light switch for switching light from the source (12) between the first (14) and second (16) utilization arrangements.

In a particular embodiment of the invention, the first ($20_1$), second ($20_2$) and/or third ($20_3$) light coupling arrangements may include a focussing lens (30), such as a Selfoc lens, an optical fiber, and/or a polarizing filter (34). The light rotator (18) may be a Faraday rotator, and the material may be YAG.

The Fabry-Perot etalon (22) of the arrangement may have a comb spectral response including (a) transmission peaks at spaced-apart wavelengths, and (b) transmission nulls corresponding to reflective peaks, the transmission nulls occurring at wavelengths lying between adjacent transmission peaks, in which case the second state corresponds to a state in which one of the transmission peaks lies at the particular wavelength. The reflection peaks may correspond with transmission nulls lying at wavelengths between the transmission peaks, and such reflection peaks tend to be broader than the transmission peaks. The first state of the arrangement corresponds to a state in which one of the reflection peaks lies at the particular wavelength, or, similarly, in which the particular wavelength lies on one of the reflection peaks.

Other embodiments of the invention will be apparent to those skilled in the art. For example, the control signal which controls the state of the etalon may be a light signal rather than a bias voltage.

What is claimed is:

1. A controllable light amplitude divider, for controllably dividing light from a source of light at a particular wavelength into two portions which, together, represent the amplitude of the input light, subject only to losses, and for coupling the light so divided to first and second utilization devices, said divider comprising:

a light rotator including first, second, and third ports, for coupling light applied to said first port of said rotator to said second port of said rotator and not to said third port of said rotator, and for coupling light applied to said second port of said rotator to said third port of said rotator, and not to said first port of said rotator;

first light coupling means coupled to said source of light and to said first port of said rotator, for coupling light between said source of light and said first input port of said rotator, said first light coupling means comprising a focussing lens;

a controllable Fabry-Perot etalon including a first port coupled to said second port of said light rotator, and also including a second port, said Fabry-Perot etalon being controllable, at said particular wavelength, to a first state in which light applied to said first port of said Fabry-Perot etalon is reflected, and a second state in which said Fabry-Perot etalon passes light applied to said first port of said Fabry-Perot etalon to said second port of said Fabry-Perot etalon;

second coupling means coupled to said second port of said Fabry-Perot etalon and to said first utilization means, for coupling light between said second port of said Fabry-Perot etalon and said first utilization means;

third coupling means coupled to said third port of said light rotator and to said second utilization means, for coupling light between said third port of said light rotator and said second utilization means; and control means coupled to said Fabry-Perot etalon, for causing said Fabry-Perot etalon to assume at least said first and second states, whereby, in said first state of said Fabry-Perot etalon, light propagating to said first port of said Fabry-Perot etalon from said second port of said light rotator is reflected back to said second port of said light rotator, and rotated to said third port of said light rotator for being made available to said second utilization means, and in said second state of said Fabry-Perot etalon, light propagating to said first port of said Fabry-Perot etalon passes to said second port of said Fabry-Perot etalon, and is made available to said first utilization means.

2. A divider according to claim 1, wherein said control means controls said Fabry-Perot etalon to only said first and second states, whereby said divider acts as a single-pole, double-throw light switch for switching light from said source between said first and second utilization means.

3. A divider according to claim 1, wherein said first light coupling means further comprises an optical fiber.

4. A divider according to claim 1, wherein said light rotator comprises YAG material.

5. A divider according to claim 1, wherein said light rotator is a Faraday rotator.

6. A divider according to claim 1, wherein said light rotator is a YAG Faraday rotator.

7. A divider according to claim 1, wherein said Fabry-Perot etalon has a comb spectral response including (a) transmission peaks at spaced-apart wavelengths, and (b) transmission nulls corresponding to reflective peaks, said transmission nulls occurring at wavelengths lying between adjacent transmission peaks, and said second state corresponds to a state in which one of said transmission peaks lies at said particular wavelength.

8. A divider according to claim 1, wherein said Fabry-Perot etalon has a comb spectral response including (a) transmission peaks at spaced-apart wavelengths, and (b) transmission nulls corresponding to relatively broad reflective peaks, said reflection peaks occurring at wavelengths lying between adjacent transmission peaks, and said first state corresponds to a state in which one of said reflection peaks lies at said particular wavelength.

* * * * *